United States Patent [19]

Walker

[11] Patent Number: 4,836,128

[45] Date of Patent: Jun. 6, 1989

[54] IDENTIFICATION MEANS

[76] Inventor: Kevin J. Walker, 2/23 Nicklin Way, Warana Beach, Queensland, Australia, 4575

[21] Appl. No.: 2,603

[22] PCT Filed: Apr. 11, 1986

[86] PCT No.: PCT/AU86/00095

§ 371 Date: Feb. 10, 1987

§ 102(e) Date: Feb. 10, 1987

[87] PCT Pub. No.: WO86/06041

PCT Pub. Date: Oct. 23, 1986

[30] Foreign Application Priority Data

Apr. 12, 1985 [AU] Australia ............................ PH 0132
Nov. 18, 1985 [AU] Australia ............................ PH 3462

[51] Int. Cl.⁴ .............................................. B64B 1/40
[52] U.S. Cl. ................. 716/210; 116/DIG. 9; 222/5; 141/329
[58] Field of Search .......... 116/210, DIG. 8, DIG. 9; 141/329, 330, 348; 206/573, 803; 222/5, 81, 83; 244/31, 33, 98; 441/92-96; 446/220, 222, 224; 40/214, 215

[56] References Cited

U.S. PATENT DOCUMENTS

| 2,862,531 | 12/1958 | Walker | 116/210 |
|---|---|---|---|
| 2,894,658 | 7/1959 | Spidy | 441/95 |
| 3,002,490 | 9/1958 | Murray | 116/210 |
| 3,279,419 | 10/1966 | Demarco | 116/210 |
| 3,310,024 | 3/1967 | McConnell | 116/210 |
| 3,332,390 | 7/1967 | Ashline | 116/210 |
| 3,381,655 | 5/1968 | Rozzelle | 116/210 |
| 3,929,091 | 12/1975 | Holder | 116/210 |
| 3,941,079 | 3/1976 | McNeill | 116/210 |
| 3,951,260 | 4/1976 | Frazee | 206/223 |
| 3,964,427 | 6/1976 | Murphy | 116/210 |
| 4,044,711 | 8/1977 | Jamison | 116/210 |
| 4,094,267 | 6/1978 | Davis, Jr. | 116/210 |
| 4,433,638 | 2/1984 | Ashline | 116/210 |

FOREIGN PATENT DOCUMENTS

| 502946 | 6/1946 | Australia | 244/153 R |
|---|---|---|---|
| 928589 | 6/1963 | United Kingdom | 141/330 |
| 1129409 | 10/1968 | United Kingdom | 116/210 |
| 1479266 | 7/1977 | United Kingdom | 116/210 |
| 2039120 | 7/1980 | United Kingdom | 116/210 |
| 2143357 | 2/1985 | United Kingdom | 116/210 |

Primary Examiner—William A. Cuchlinski, Jr.
Assistant Examiner—W. Morris Worth
Attorney, Agent, or Firm—Charles W. Fallow

[57] ABSTRACT

A position indicating device (10) including a capsule (11) of lighter-than-air gas, a balloon envelope (13) and a connection and release assembly (12) securing the balloon envelope (13) to the capsule (11). The connection and release assembly (12) includes an actuator (29) which may be rotated to cause the capsule (11) to be pierced and permit gas to escape into the balloon envelope (13) and a release pin (46) to release the balloon envelope (13) when inflated. The height of elevation of the balloon envelope (13) is governed by a tether (21).

5 Claims, 2 Drawing Sheets

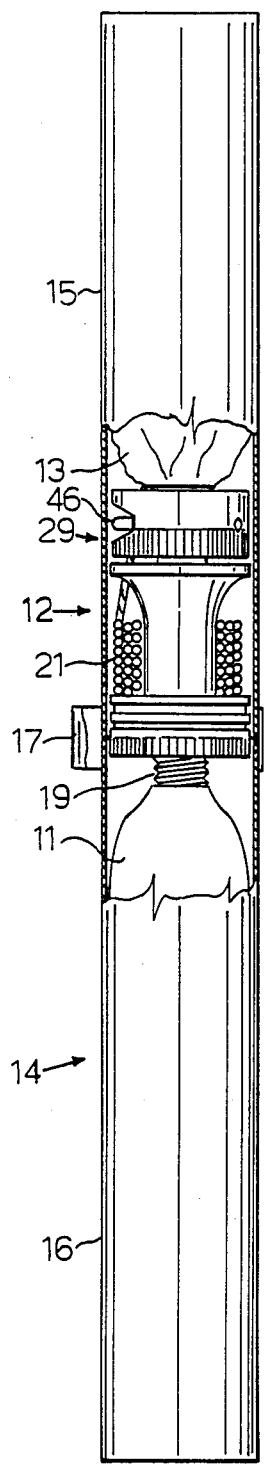
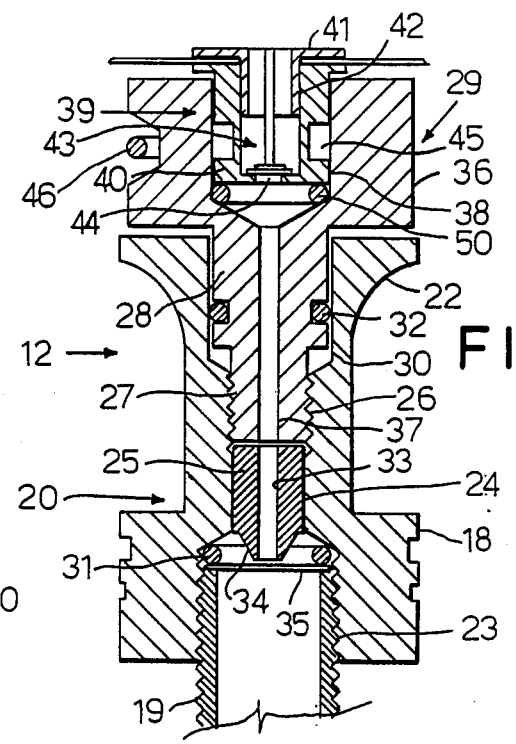
FIG.1
FIG.2

4,836,128

IDENTIFICATION MEANS

TECHNICAL FIELD

This invention relates to position indicating means and particularly to means for identifying a position or location of objects or persons not otherwise easily identifiable.

BACKGROUND ART

It is a common occurrence for persons when bushwalking, backpacking or undertaking like activities to become lost. Normally the location of such persons is difficult to detect even with the use of aircraft such as helicopters or the like. Similarly, if a person becomes lost overboard from a ship or other vessel, or if a vessel founders causing say the crew thereof to board liferafts, the location of such persons is extremely difficult. Often, failure to locate persons in the above predicament results in fatalities. Although various means are available to facilitate detection of such persons such as brightly coloured clothing or life jackets which may be worn by the person or dan buoys which may be thrown overboard to indicate the general area where the person has disappeared from a vessel, such means are of limited usefulness because they cannot be visually or otherwise easily located when one is some distance therefrom. Emergency signal beacons for transmitting a radio signal in the result of emergencies are also available, however, such devices are not suited to all situations and often lack reliability.

DISCLOSURE OF INVENTION

The present invention aims to overcome or alleviate at least some of the above disadvantages by providing position indicating means for facilitating the identification of positions or locations of objects or persons not normally readily locatable or identifiable such as persons lost overboard from vessels or persons lost in other circumstances on land. Other objects and advantages of the invention will become apparent hereunder.

With the above and other objects in view, this invention resides broadly in a device for providing an indication of a position comprising an inflatable balloon envelope, a container of compressed ligher-than-air gas connected to said balloon envelope, release means adapted to be actuated to permit said gas to be released from said container into said balloon envelope to inflate the latter and thereby permit said inflated balloon envelope to elevate and tether means secured to said balloon envelope and adapted in use to limit the height of elevation of said inflated balloon envelope.

BRIEF DESCRIPTION OF DRAWINGS

In order that the invention may be more readily understood and put into practical effect, reference will now be made to the accompanying drawings which illustrate a preferred embodiment of the invention and wherein:

FIG. 1 is a partly cut away elevational view of a position identifying device according to one form of the present invention in an inoperative stored attitude;

FIG. 2 is an enlarged sectional elevational view showing details of the connection between the balloon and gas filling capsule of the device;

BEST MODE OF CARRYING OUT THE INVENTION

Figure 3:
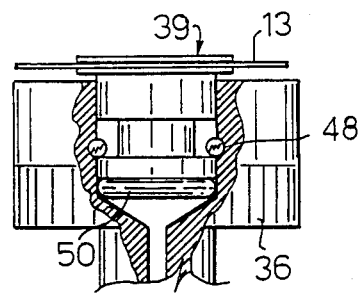
FIGS. 3 and 4 illustrate the release mechanism for the balloon in an engaged and disengaged attitude respectively.

Referring to the drawings and firstly to FIG. 1, there is illustrated a position indicating or identifying device 10 according to a first form of the present invention comprising a capsule or cannister 11 of compressed gas suitably helium or other lighter-than-air gas, a connection and release assembly 12 mounted to the capsule 11 and an inflatable balloon 13 secured to the assembly 12. Preferably the capsule 11, connection assembly 12 and balloon envelope 13 are in their inoperative position, stored within a generally tubular container 14 of slightly greater diameter than the capsule 11. The container 14 is suitably formed in two opposed parts 15 and 16 which may be simply arranged so that one part 15 receives the balloon envelope 13 and connection assembly 12 whilst the other part 16 receives the capsule 11. The container parts 15 and 16 in the inoperative position of the device 10 may be held together by any suitable connection arrangement such as by means of an adhesive tape 17 wrapped about the joint between the parts 15 and 16.

The connection and release assembly 12 as shown more clearly in FIG. 2 comprises a capsule connector member 18 which is threadedly coupled to the threaded neck portion 19 of the capsule 11 and which is cut away on its outer surface to define a reel 20 for a balloon tether 21 which may be wound thereabout. Suitably the winding surface of the reel diverges at its end 22 adjacent the balloon 13 to facilitate removal of the tether in use.

As shown, the connector member 18 is internally bored and comprises a first threaded portion 23 for connection to the capsule neck portion 19, an adjacent reduced diameter unthreaded portion 24 for receipt of a capsule piercing member 25 and a further threaded portion 26 for engagement by the threaded leading end 27 of a shank 28 of a piercing member actuator 29. The connector member 18 also includes a further unthreaded bore portion 30 for close receipt of the unthreaded portion of the shank 28. To ensure sealing between the connector member 18 and capsule 11, an O-ring seal 31 is provided within the threaded portion 23 for engagement and sealing compression by the end of the capsule 11. A further O-ring seal 32 is arranged within an annular groove in the actuator shank 28 to sealingly engage the bore portion 30 so as to ensure sealing between the actuator 29 and connector member 18.

The piercing member 25 includes a central bore 33 and a leading tapered piercing portion 34 which may pierce a seal 35 on the end of the capsule neck 19 so as to permit gas to escape from the capsule 11 and pass into the bore 33.

The actuator 29 includes an enlarged head portion 36 integral with the shank 28 and preferably knurled on its outer surface to facilitate manual grasping and rotation. The actuator 29 is also centrally bored including a relatively small diameter portion 37 in the shank 28 communicating with the bore 33 in the piercing member 25 and a stepped out enlarged portion 38 which is arranged to receive a valve assembly 39. This valve assembly 39 includes a hollow housing 40 sealingly secured at one end to the balloon envelope 13 by means of a hollow plug 41 and provided with a central bore 42 which communicates with the interior of the balloon 13. The bore 42 also includes a one-way valve 43 which permits gas to pass into the balloon envelope but which prevents the escape of gas therefrom. Suitably the valve 43 comprises a simple flap valve having a sealing member or flap 44 formed of flexible material such as rubber or neoprene normally seated against an end wall of the bore 42. Alternatively the valve 43 may comprise a spring loaded ball valve.

The outer surface of the housing 40 is provided with an annular groove 45 which is engaged by a release pin 46 fitted into apertures 47 in the head 36 of the actuator 29. Preferably the release pin 46 is of generally U-shaped form with the respective legs 48 thereof received within respective parallel apertures 47 in the actuator head and locatable on respective opposite sides of the groove 45 as shown more clearly in FIGS. 3 and 4. The pin 46 is also located in the actuator head 36 so that the legs 48 thereof act against the lower step 49 of the annular groove 45 so as to force or maintain the housing 40 in sealing engagement with an O-ring seal 50 located in the stepped area of the actuator bore 38.

The tether 21 on the reel 20 may be secured to the balloon envelope 13 in any suitable fashion such as by simply tying or by means of another connection to the valve assembly 39.

Figure 4:
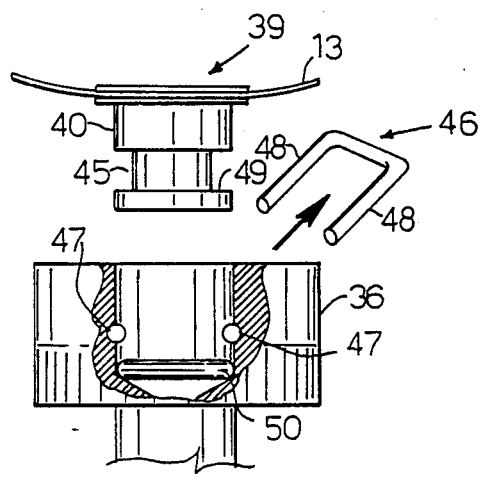
Figure 5:
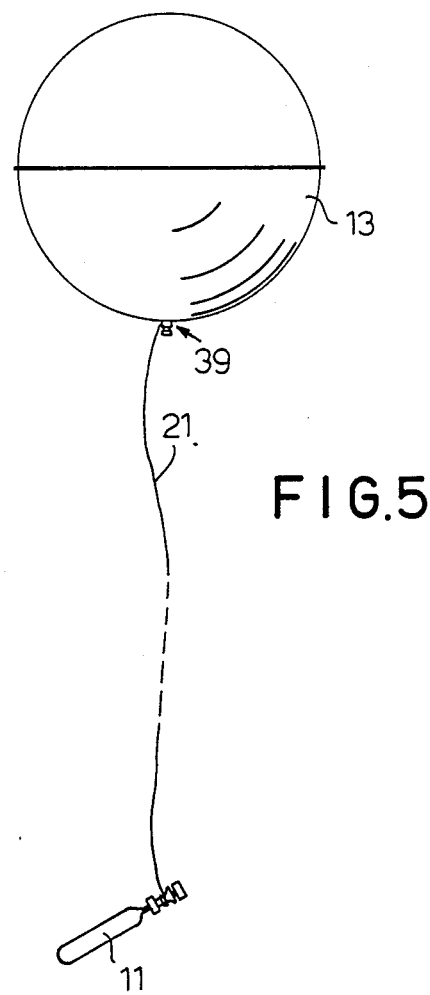
FIG. 5 illustrates the use of the position identifying device of the present invention.

In use, the container 14 may be simply secured say to a lifejacket or carried in a pocket therein or alternatively carried in a rucksack. In the event that the device is required to be actuated, at least the top part 15 of the container 14 is removed by releasing the tape 17 so as to expose the balloon envelope 13 and actuator 29. The head 36 of the actuator 29 may then be grasped and rotated relative to the connector member 18 to advance the shank 27 therein and consequently cause the piercing member 20 to be forced into the capsule seal 35. When the seal 35 has been pierced, the gas will escape from the capsule 11, pass through the bores 33, 37 and 38 and via the valve 43 into the balloon envelope 13 to inflate the latter. When the balloon has been fully inflated, the release pin 46 may be withdrawn to release the balloon valve 39 and as shown in FIGS. 4 and 5, permit the inflated balloon 13 with attached valve 39 to rise upwardly whilst at the same time unravelling the tether 21 from the reel 20 to an extent required by the user who maintains hold of or anchors the capsule 11. Gas will be prevented from escaping from the inflated balloon 13 by the one-way valve 43 and the balloon 13 is elevated to a height so as to be visible to searchers or the like.

Preferably the balloon 13 is constructed of a material reflective to electromagnetic waves to render the balloon easily detectable by means of radar. For this purpose the balloon is preferably formed of a metallised plastics material and may be shaped to have a plurality of reflecting surfaces, for example of rectangular, hexagonal or other suitable shape or alternatively of round shape. Where harsh environments are likely to be encountered for example, sea water, the balloon envelope may be constructed to have a protected reflective surface, for example the balloon envelope may be formed of a laminated material, the outer layer thereof being formed of a clear plastics material such as nylon and the adjacent inner layer comprising a reflective metallic layer such as a metallised plastics material. This arrangement will ensure the metallised layer is not exposed to, for example sea water which would affect its operating efficiency. In an alternative arrangement, the balloon may be formed of a plastics material such as transparent PVC with a sheet or sheets of reflective foil such as aluminium reflective foil or other material located therein to act as a radar reflector. In a further alternative arrangement, the balloon may be formed separately of PVC or other plastics or synthetic material and carry an external radar reflector or any other means which will reflect electromagnetic waves.

In an alternative configuration of position indicating device according to the present invention, the balloon envelope 13 is selected to contain such a volume of gas that it will elevate the capsule or cannister 11 on release of gas therefrom into the balloon 13. This arrangement obviates the need for a separate releasable valve assembly 39 whilst the tether 21 may simply be secured at one end to the capsule 11 and grasped at the other end by the user or tied off or otherwise secured to a suitable anchor such as a life jacket. As in the FIGS. 1 to 4 embodiment, a reel may also be associated with the tether so that if necessary, for example in the case of high winds, the balloon may be wound in to prevent damage whilst the balloon may then subsequently be released to again lift to a detectable height.

The capsule 11 and connection and release assembly 12 are preferably formed of lightweight material such as aluminium. Similarly the tether 21 is preferably formed of a light material such as nylon.

In some instances, a larger balloon may be required and for this purpose more than one capsule 11 may be associated with the balloon. Preferably such capsules are attachable to a header pipe which communicates with the balloon neck. Many differing configuration of capsule opening means may be employed whilst in an alternative form of piercing member 25, the passageway 33 branches towards one side of the member 25 so that the leading portion is of substantially conical imperforate form. Thus in the initial piercing action, the piercing member 25 acts as a plug in the seal 35 so that gas will not immediately be released from the capsule 11. However rotation of the head portion 36 in the opposite direction will permit the piercing member 25 to move rearwardly and a controlled escape of gas into the passageways 33, 37 and 42 and thus into the balloon 13. This of course may be regulated by varying the extent of projection of the conical leading portion of the pierced member 25 into outlet aperture formed in the capsule seal 35. The piercing member 25 may also be formed in one piece with the actuator 29 if desired.

Whilst the above has been given by way of illustrative example of the invention, many modifications and variations as would be apparent to persons skilled in the art may be made to the above described embodiment without departing from the broad scope and ambit of the invention as herein defined in the appended claims.

I claim:

1. In position indicating device of the type employing a tethered elevated inflated balloon to indicate position, said device comprising a balloon having a one-way valve, a tether for the balloon, an elongate container housing the balloon in one end, a capsule of compressed light-than-air gas in the other end of the container and a connection and release assembly between the balloon and the capsule, a frangible seal closing the capsule, the improvement wherein the capsule connection and release assembly comprises a valve receiver, a quickrelease mechanism for retaining the valve in sealing engagement with the valve receiver and being manually operable to release the valve from the valve receiver, a capsule connector member sealingly engaged with the capsule and connected to the valve receiver, means defining an uninterrupted passage from the capsule connector member to the valve receiver for the passage of gas between the capsule and the one-way valve, and a hollow piercing member movable relative to the capsule connector member in response to movement of said valve receiver toward said frangible seal, for piercing the frangible seal and releasing the gas from the capsule whereupon gas passes along the passage and through the one-way valve to inflate the balloon.

2. The invention of claim 1, wherein said one-way valve includes a hollow housing and said valve receiver is provided with a bore and sealing means within said bore, said housing being supported sealingly in said bore and said valve receiver including an aperture for receiving a releasable retaining pin, said releasable retaining pin being receivable in said aperture in said valve receiver and being engageable with said housing to retain said housing within said bore and into enagement with said sealing means within said bore.

3. The invention of claim 2, wherein said capsule connector member has a bore for slidable receipt of said piercing member and wherein said valve receiver is in screw threaded engagement with said capsule connector member, whereby rotation of said valve receiver relative to said connector member advances said piercing member toward said frangible seal.

4. The invention of claim 1, wherein said connection and release assembly includes a reel for supporting said tether therearound.

5. The invention of claim 4, where said capsule connector member is elongate and said reel is provided on a cut away portion of said connector member.

* * * * *